US010394044B2

(12) United States Patent
Hu et al.

(10) Patent No.: US 10,394,044 B2
(45) Date of Patent: Aug. 27, 2019

(54) OPTICAL IMAGE ANTI-SHAKE DEVICE WITH YOKE

(71) Applicant: TDK TAIWAN CORP., Yangmei, Taoyuan County (TW)

(72) Inventors: Chao-Chang Hu, Yangmei (TW); Shu-Shan Chen, Yangmei (TW); Yi-Ho Chen, Yangmei (TW)

(73) Assignee: TDK TAIWAN CORP., Yangmei, Taoyuan County (TW)

( * ) Notice: Subject to any disclaimer, the term of this patent is extended or adjusted under 35 U.S.C. 154(b) by 604 days.

(21) Appl. No.: 15/131,396

(22) Filed: Apr. 18, 2016

(65) Prior Publication Data

US 2016/0306185 A1 Oct. 20, 2016

(30) Foreign Application Priority Data

Apr. 17, 2015 (TW) ............................ 104112337 A

(51) Int. Cl.
*G02B 7/02* (2006.01)
*G02B 27/64* (2006.01)
*H04N 5/225* (2006.01)
*H04N 5/232* (2006.01)

(52) U.S. Cl.
CPC .......... *G02B 27/646* (2013.01); *G02B 7/023* (2013.01); *H04N 5/2253* (2013.01); *H04N 5/2254* (2013.01); *H04N 5/23287* (2013.01)

(58) Field of Classification Search
CPC .......... G02B 27/646; G03B 2205/0007; H04N 5/23248
USPC ................................................ 359/554, 557
See application file for complete search history.

(56) References Cited

U.S. PATENT DOCUMENTS

2011/0096178 A1* 4/2011 Ryu .................... H04N 5/2252 348/208.2

FOREIGN PATENT DOCUMENTS

JP 201165140 3/2011

* cited by examiner

*Primary Examiner* — Robert E. Tallman
(74) *Attorney, Agent, or Firm* — Locke Lord LLP; Tim Tingkang Xia, Esq.

(57) ABSTRACT

An optical image anti-shake device with a yoke is provided. The optical image anti-shake device includes: a casing having a first aperture; a fixing portion having a bottom plate, the bottom plate having a second aperture corresponding in position to the first aperture; and an active portion enclosed by the casing and resiliently clamped between the casing and the bottom plate by the fixing portion, the active portion including: a correcting module for correcting, with a magnetic force, a blur of images caused by a shake of the optical image anti-shake device; a frame having a receiving space; a lens holder disposed in the receiving space of the frame; a lens unit corresponding in position to the first aperture and the second aperture, the lens unit being carried by the lens holder and having an image-capturing optical axis; and a yoke fixed to the frame.

17 Claims, 10 Drawing Sheets

OPTICAL IMAGE ANTI-SHAKE DEVICE WITH YOKE

RELATED APPLICATIONS

This application claims priority to Taiwan Application Serial Number 104112337, filed on Apr. 17, 2015, which is incorporated by reference herein in its entirety.

BACKGROUND OF THE INVENTION

Field of the Invention

The present invention relates to optical image anti-shake devices and, more particularly, to an optical image anti-shake device for use with cameras and mobile devices.

Description of the Prior Art

One of the most important challenges facing by persons skilled in the art is to reduce or even eliminate the effect of a shaking camera positioned at a handheld device or a moving carrier (such as an automobile or a flight vehicle) upon pictures of formed images in the course from picture-taking to image-forming.

Optical image anti-shake technique, which is rapidly developing, is regarded as a potential leader of image anti-shake techniques in the years to come. Unlike a digital image anti-shake mechanism, the optical image anti-shake technique has advantages as follows: image-forming quality never deteriorates despite software-based correction; and software-based processing is seldom prolonged.

Due to the development of mobile electronic devices, such as cellular phones and tablets, mini cameras are becoming more popular. Consumers and researchers look forward to enhancing the performance of mini cameras while maintaining their compact appearance, especially applying the optical image anti-shake technique of existing cameras to mini cameras disposed inside mobile electronic apparatuses, such as cellular phones and tablets, and enhancing the performance of the mini cameras.

During a picture-taking process, a conventional optical image anti-shake device compensates for the vibration of cameras with a magnetic force as a result of the induction effectuated by a magnet and a driving coil. Hence, the distribution and stability of the magnetic force in the device is of vital importance.

Japan Published Patent Application 2011-128583 discloses a lens-unit driving device, wherein a magnet retention portion material is capable of enhancing the magnetic efficiency of an autofocus magnet. Although Japan Published Patent Application 2011-128583 discloses preventing the magnetic lines of force of the autofocus magnet from dispersing but does not disclose protecting an anti-shake magnet against the interference from an external magnetically permeable component. As a result, Japan Published Patent Application 2011-128583 has a drawback as follows: if a magnetically permeable component is disposed outside the lens-unit driving device, it will attract the anti-shake magnet and thereby affect the operation of the optical image anti-shake mechanism.

Japan Published Patent Application 2012-113230 discloses an autofocus module with a casing which is capable of enhancing the magnetic efficiency of a magnetic field and located at a fixing portion, wherein a magnet is disposed inside the casing, fixed to the inner periphery of the casing, and located at the fixing portion; hence, even if a magnetically permeable component is disposed outside the autofocus module, it will not affect the autofocus mechanism. However, Japan Published Patent Application 2012-113230 has a drawback, that is, if the internal magnet is located at an active portion, the casing cannot prevent the magnet from attracting an external magnetically permeable component.

SUMMARY OF THE INVENTION

In view of the aforesaid drawbacks of the prior art, there is a need for an optical image anti-shake device capable of converging magnetic lines of force and precluding external electromagnetic interference. The present invention provides an optical image anti-shake device with a yoke. The yoke has high magnetic retentivity and is capable of enhancing a magnetic force and precluding external electromagnetic interference.

It is an objective of the present invention to provide an optical image anti-shake device which comprises: a casing having a first aperture; a fixing portion having a bottom plate, the bottom plate having a second aperture corresponding in position to the first aperture; and an active portion enclosed by the casing and resiliently clamped between the casing and the bottom plate by the fixing portion, the active portion comprising: a correcting module for correcting with a magnetic force, a blur of images caused by a shake of the optical image anti-shake device; a frame having a receiving space; a lens holder disposed in the receiving space of the frame; a lens unit corresponding in position to the first aperture and the second aperture, the lens unit being carried by the lens holder, and having an image-capturing optical axis; and a yoke fixed to the frame.

The present invention further provides an image capturing device comprising the optical image anti-shake device.

The present invention further provides an electronic device comprising the image capturing device.

The aforesaid and other aspects of the present invention are illustrated with non-restrictive embodiments and accompanying drawings and described below.

DETAILED DESCRIPTION OF THE EMBODIMENTS

Figure 1:
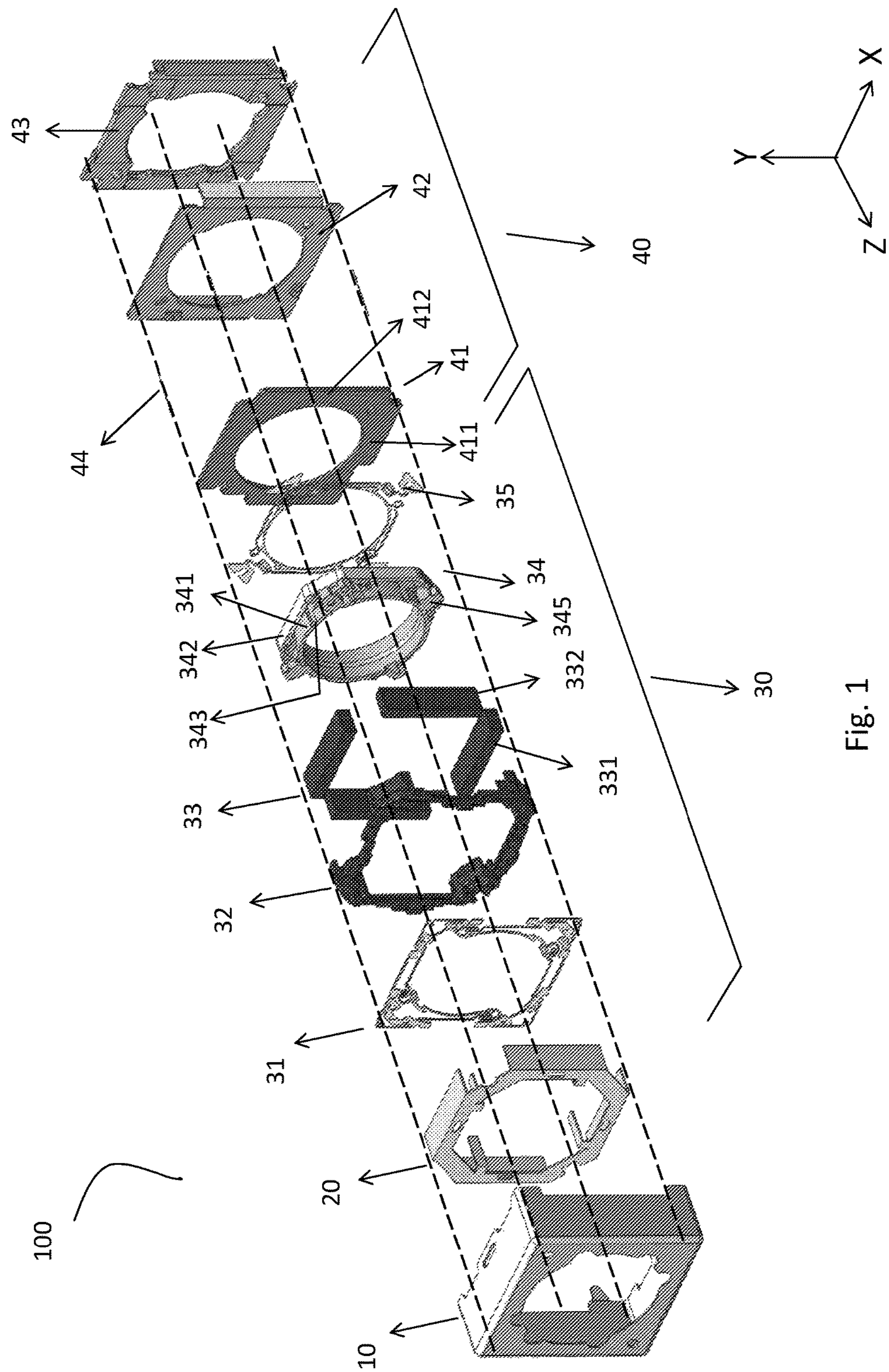
FIG. 1 is an exploded view of an optical image anti-shake device of the present invention.

The present invention is hereunder illustrated with embodiments and drawings and described below. The drawings and the description below are further provided with reference numerals. The verb "comprise" used in the description below is syntactically open and thereby should be interpreted to mean "includes, but is not limited to." Persons skilled in the art understand that it is not uncommon for a single component/product to have different names, for example, "lens holder" and "lens container." Hence, all components/products equivalent to the ones mentioned herein in terms of technical field and function should be interpreted to fall within the scope of the present invention.

Referring to FIG. 1, there is shown an exploded view of an optical image anti-shake device 100 according to an embodiment of the present invention, with reference to an X-axis, a Y-axis and a Z-axis. In this embodiment, the optical image anti-shake device 100 comprises a casing 10, an active portion 30, and a fixing portion 40. The casing 10 has a first aperture. The fixing portion 40 has a bottom plate 43. The bottom plate 43 has a second aperture corresponding in position to the first aperture. The active portion 30 is enclosed by the casing 10 and resiliently clamped between the casing 10 and the bottom plate 43 by the fixing portion 40. The active portion 30 further comprises a yoke 20, a frame 32, a magnet unit 33, a lens holder 34, an upper flat spring 31, a lower flat spring 35, and a lens unit (not shown).

The magnet unit 33 in the active portion 30 and an X-axis driving coil 411, a Y-axis driving coil 412 and a plurality of suspension lines 44 in the fixing portion 40 together form a correcting module whereby blurred images caused by the vibration of the optical image anti-shake device 100 are compensated for under a magnetic force. For example, in the event of a shake of a user's hand holding a handheld optical image device for taking pictures or a shake of the handheld optical image device because of the movement of an optical zoom lens unit during the focusing process thereof, the system shake amplitude will be compensated for by the movement of the lens unit.

The frame 32 in the active portion 30 has a receiving space. The lens holder 34 is disposed in the receiving space of the frame 32. The lens unit corresponds in position to the first aperture and the second aperture. The lens unit is carried by the lens holder 34 and defined with an image-capturing optical axis. The yoke 20 is fixed to the frame 32 from above.

The fixing portion 40 further comprises a coil 41 and a circuit board 42. The coil 41 comprises an X-axis driving coil 411 and a Y-axis driving coil 412. The circuit board 42 comprises an electronic circuit for controlling the X-axis driving coil 411 and Y-axis driving coil 412 to generate an electromagnetic effect and thereby effectuate mutual attraction or repulsion relative to the magnet unit 33; hence, a correction to the position of the lens holder 34 suspended in the receiving space of the frame 32 is accompanied by a correction to the position of the lens unit carried by the lens holder 34.

Figure 2:
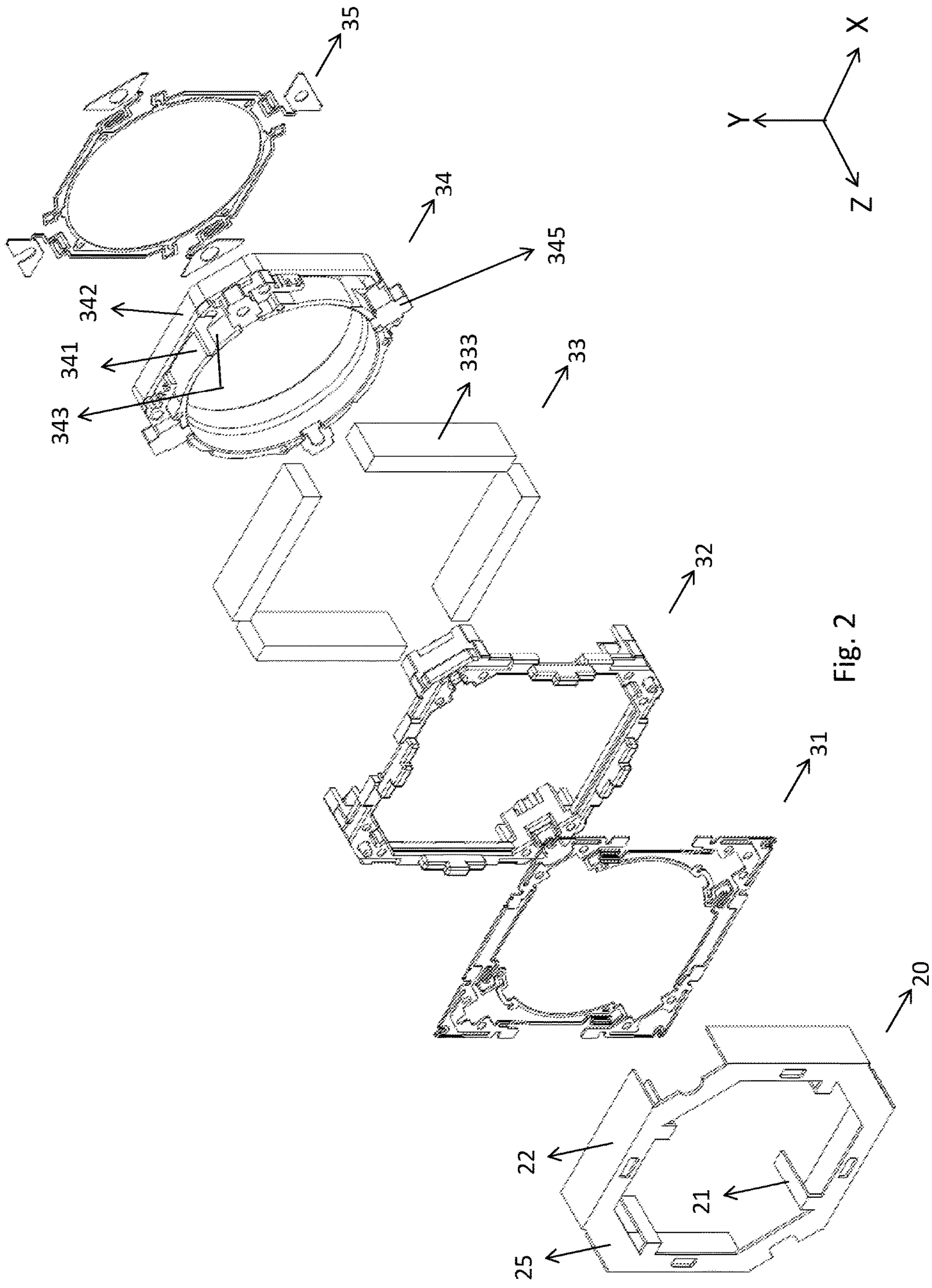
FIG. 2 is an exploded view of an active portion of the optical image anti-shake device viewed from above according to the present invention.

Referring to FIG. 2, there is shown an exploded view of the active portion 30 of the optical image anti-shake device 100 viewed from above according to an embodiment of the present invention, with reference to an X-axis, a Y-axis and a Z-axis. In this embodiment, the optical image anti-shake device 100 is defined with an X-axis, a Y-axis and a Z-axis which are perpendicular to each other. The yoke 20 has at least a top surface 25 which is perpendicular to the Z-axis to limit the displacement of the lens holder along the Z-axis.

The yoke 20 further has an outer wall 22 which is perpendicular to the top surface 25. The outer wall 22 corresponds in position to an outer surface 333 of the magnet unit 33. The yoke 20 further has an inner wall 21 which is perpendicular to the top surface 25. The inner wall 21 extends to a notch portion 343 between a Z-axis driving coil 342 and an external wall 341 of the lens holder 34. Hence, the outer wall 22, the top surface 25 and the inner wall 21 of the yoke 20 together enclose the magnet unit 33 and the Z-axis driving coil 342 partially.

The top surface 25 of the yoke 20 is an octagon such that the suspension lines 44 in the correcting module pass through the yoke 20 easily. The two ends of each suspension line 44 are fixed to the casing 10 and the bottom plate 43, respectively, such that the lens holder 34 is suspended along the Z-axis in a predetermined space of the frame 32.

The notch portion 343 disposed on the external wall 341 of the lens holder 34 allows the Z-axis driving coil 342 to be disposed on the external wall 341 of the lens holder 34. The notch portion 343 is accommodated between the Z-axis driving coil 342 and the external wall 341 of the lens holder 34 on the inner wall 21 of the yoke 20.

The lens holder 34 has a stop portion 345. The stop portion 345 allows the lens holder 34 to move along the Z-axis toward the yoke 20 for a predetermined distance before being stopped by the top surface 25 of the yoke 20. Therefore, the yoke 20 provides a resistance for stopping the lens unit and the lens holder 34 from proceeding outward along the optical axis, i.e., the Z-axis. Hence, according to the present invention, the stop mechanism effectuated by the stop portion 345 of the lens holder 34 and the yoke 20 replaces a stop lid in a conventional picture-taking device and thereby efficiently stops the lens unit and the lens holder 34 from moving outward (in the direction of the casing 10.)

The magnet unit 33 of the correcting module comprises at least an X-axis magnet 331 and at least a Y-axis magnet 332. The at least an X-axis magnet 331 is disposed between the yoke 20 and the lens holder 34 and corresponds in position to the X-axis driving coil 411. The at least a Y-axis magnet 332 is disposed between the yoke 20 and the lens holder 34 and beside the X-axis magnet 331 and corresponds in position to the Y-axis driving coil 412. The X-axis driving coil 411 operates in conjunction with the X-axis magnet 331 and compensates for a blur of images caused by a shake of the lens unit along the X-axis. The Y-axis driving coil 412 operates in conjunction with the Y-axis magnet 332 and compensates for a blur of images caused by a shake of the lens unit along the Y-axis.

The two ends of each suspension line 44 in the correcting module are fixed to the upper flat spring 31 and the circuit board 42, respectively, to allow the active portion 30 to move along the X-axis and Y-axis. When optical image anti-shake device 100 senses a blur of images caused by an external shake, the X-axis driving coil 411 and Y-axis driving coil 412 generate the electromagnetic effect and operate in conjunction with the X-axis magnet 331 and Y-axis magnet 332. Since both the X-axis driving coil 411 and Y-axis driving coil 412 are located at the fixing portion 40, both the X-axis magnet 331 and Y-axis magnet 332 which are located at the active portion 30 drive the active portion 30 to move along the X-axis and Y-axis, so as to correct the position of the lens holder 34 suspended in the receiving space of the frame 32.

The upper flat spring 31 in the active portion 30 is disposed on a lateral surface of the frame 32. The lower flat spring 35 is disposed on another lateral surface of the frame 32. The lower flat spring 35 and the upper flat spring 31 clamp the lens holder 34 resiliently within the receiving space of the frame 32. Both the upper flat spring 31 and the lower flat spring 35 are electrically conductive and thus function as conducting wires for use in transmitting the driving current of the Z-axis driving coil 342.

The active portion 30 further comprises a Z-axis magnet (in this embodiment, the Z-axis magnet is integrated into the magnet unit 33) to not only operate in conjunction with the Z-axis driving coil 342 but also compensate for the displacement of the lens unit along the Z-axis. For example, a shake is caused to a handheld camera equipped with an optical zoom lens unit by the movement of the lens unit while the optical zoom lens unit is focusing. The shake can be corrected by a magnetic force. Alternatively, in the event of low illumination, a shake-induced blur of images can be corrected by increasing the admitted light.

The yoke 20 is made of a magnetically permeable material. Not only does the yoke 20 enclose the magnet unit 33 and the Z-axis driving coil 342 partially, but the yoke 20 also converges the magnetic lines of force generated from the magnet unit 33 in the active portion 30, precludes external electromagnetic interference, enhances magnetic retentivity and magnetic force, and prevents an electronic device from causing electromagnetic interference, such as NFC, COIL, EMI. In the situation where a fixed magnetically permeable component is disposed outside the optical image anti-shake device 100, the yoke 20 can prevent the magnet unit 33 from attracting an external magnetically permeable component to thereby not only prevent the correcting module failure and efficiency deterioration which might otherwise occur as a result of the attraction of an external magnetically permeable component to the magnet unit 33 but also reduce mutual magnetic field interference.

Moreover, the yoke and the frame are both made by an insert molding process so as to be an integral. The assembly of the optical image anti-shake device will be simplified, the compatibility between the yoke, the frame and other elements will be improved, and the anti-shake function will be much more efficiently performed.

Figure 3:
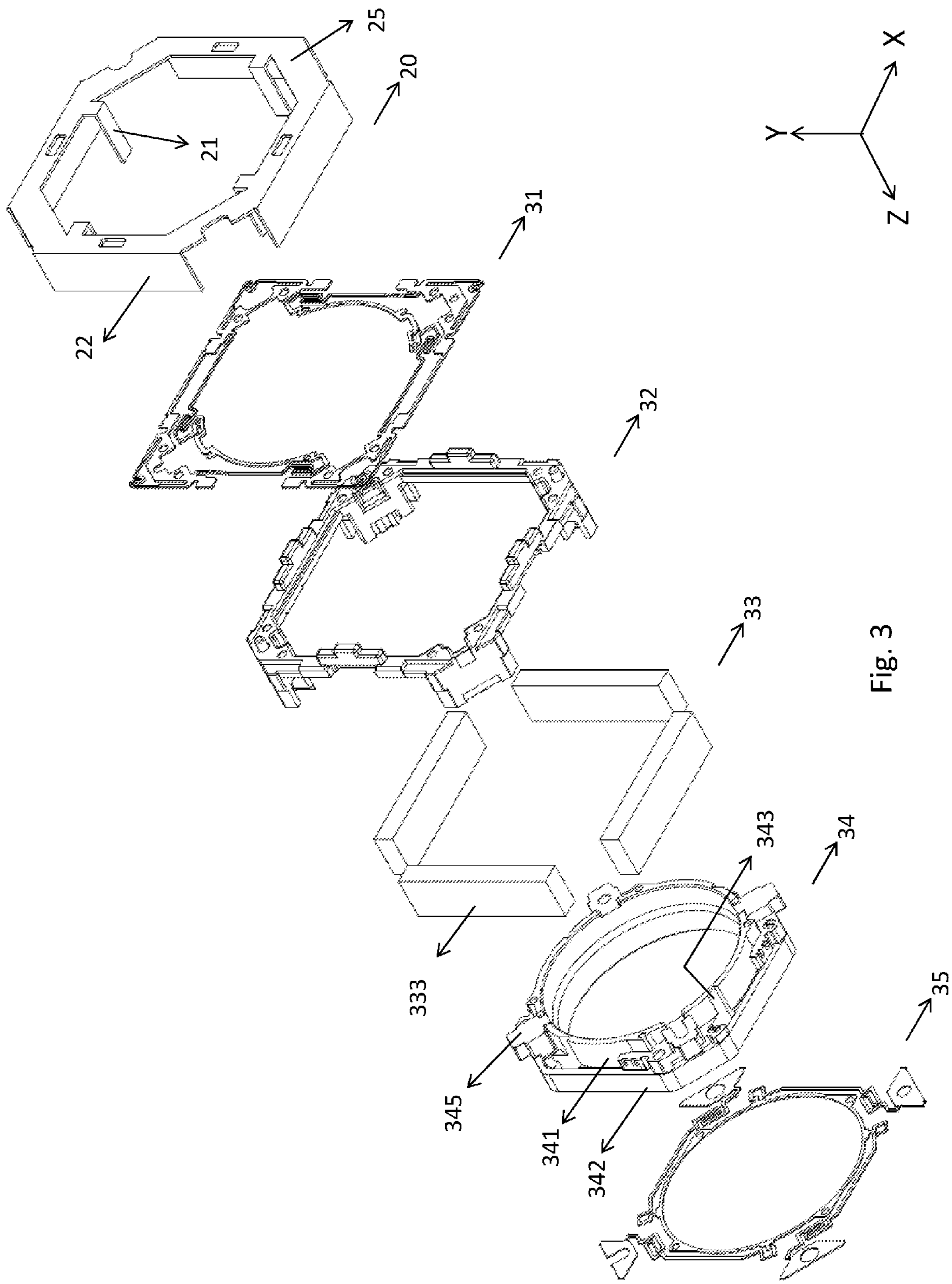
FIG. 3 is an exploded view of the active portion of the optical image anti-shake device viewed from below according to the present invention.
Figure 4:
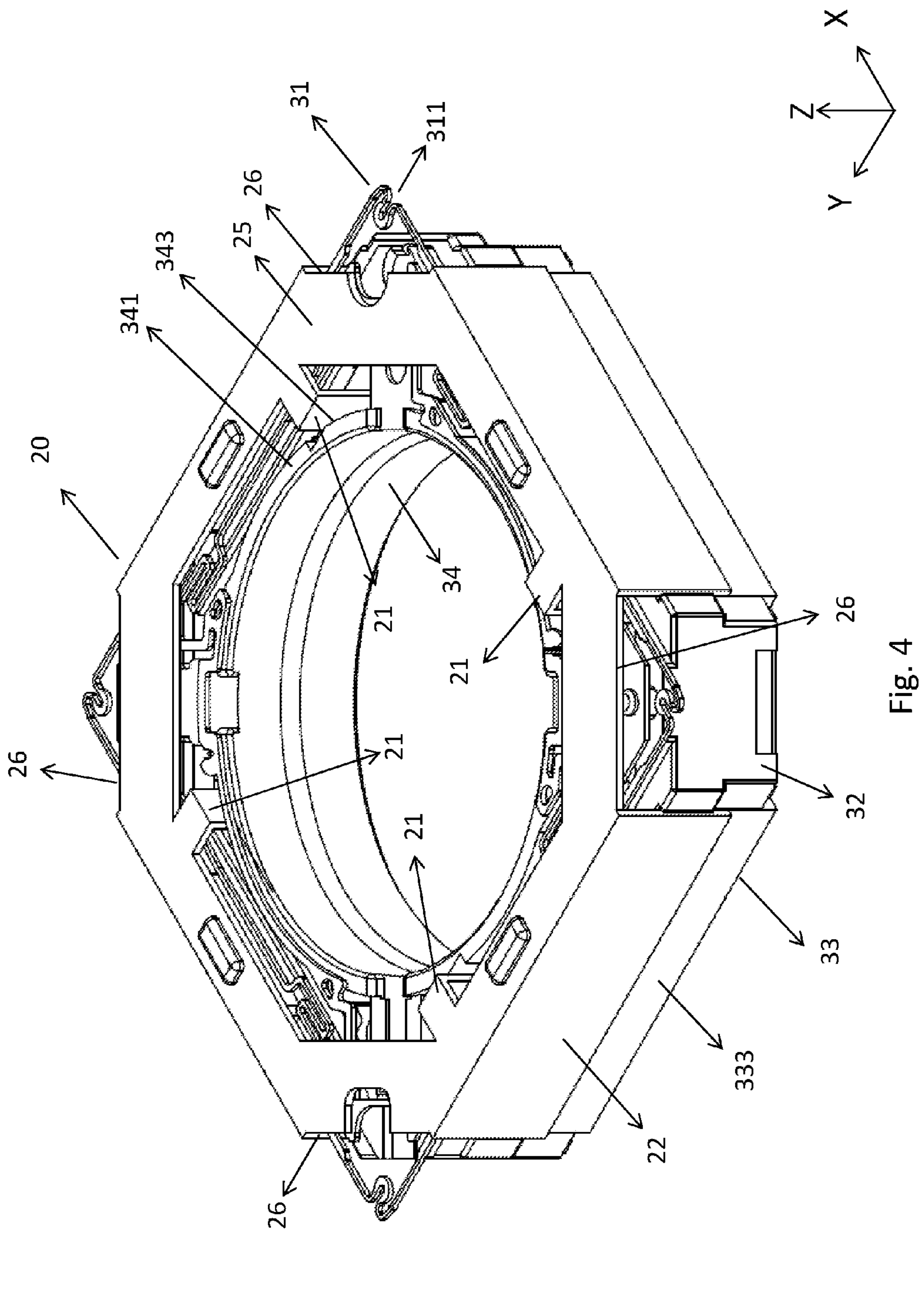
FIG. 4 is an isometric view of the active portion of the optical image anti-shake device of the present invention.

Referring to FIG. 3, there is shown an exploded view of the active portion 30 of the optical image anti-shake device 100 viewed from below according to the present invention, with reference to an X-axis, a Y-axis and a Z-axis. FIG. 3 differs from FIG. 2 in the angle of view of observing the active portion 30. Components shown in FIG. 3 are identical to their counterparts in FIG. 2 in structure, name and reference numeral and thus are not described hereunder for the sake of brevity. Referring to FIG. 3 and FIG. 4, the yoke 20, upper flat spring 31, frame 32, magnet unit 33, lens holder 34 and lower flat spring 35 each have an aperture for receiving a lens unit and exhibit fourfold symmetry. For example, the external wall 341, Z-axis driving coil 342, notch portion 343 and stop portion 345 are disposed on each of the four sides of the lens holder 34, whereas a plurality of inner walls 21 and a plurality of outer walls 22 are disposed on the four sides of the yoke 20 and perpendicular to the top surface 25.

Referring to FIG. 4, there is shown an isometric view of the active portion 30 of the optical image anti-shake device 100 according to an embodiment of the present invention, wherein the active portion 30 is assembled by putting together the components shown in FIG. 2, with reference to an X-axis, a Y-axis and a Z-axis. Components shown in FIG. 4 are identical to their counterparts in FIG. 2 in structure, name and reference numeral and thus are not described hereunder for the sake of brevity. Referring to FIG. 4, the outer walls 22, which are disposed on the four sides of the yoke 20, are perpendicular to the top surface 25 and correspond in position to outer walls 333 of the magnet unit 33, respectively. The inner walls 21 disposed on the four sides of the yoke 20 extend to the notch portion 343 between the Z-axis driving coil 342 (not shown in FIG. 4) and the external wall 341 of the lens holder 34. The yoke 20 is fixed to the frame 32 and encloses the upper flat spring 31, frame 32, magnet unit 33, lens holder 34, and lower flat spring 35 (not shown in FIG. 4). The yoke 20 further has a cut portion 26. The suspension lines 44 (not shown in FIG. 4) are disposed outside the cut portion 26 of the yoke 20. Hence, even though the yoke 20 encloses the upper flat spring 31, a recess 311 of the upper flat spring 31 is exposed and penetrated by the suspension lines 44, thereby allowing the active portion 30 to move along the X-axis and Y-axis.

Figure 5:
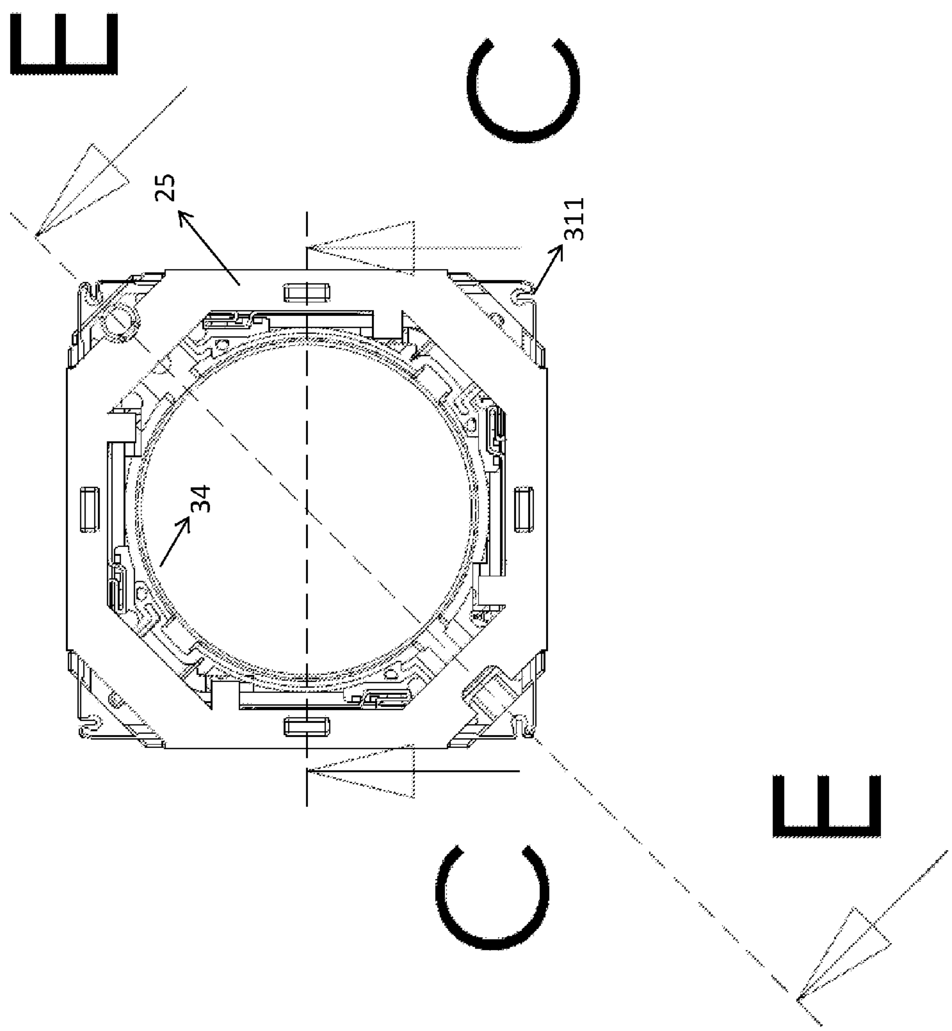
FIG. 5 is a top view of the active portion of the optical image anti-shake device of the present invention.

Referring to FIG. 5, there is shown a top view of the assembled active portion 30 of the optical image anti-shake device 100 according to an embodiment of the present invention. Components shown in FIG. 5 are identical to their counterparts in FIG. 2 in structure, name and reference numeral and thus are not described hereunder for the sake of brevity. Referring to FIG. 5, the top surface 25 of the yoke 20 is an octagon, whereas the recess 311 of the upper flat spring 31 is penetrated by the suspension lines 44. The two ends of each suspension line 44 are fixed to the upper flat spring 31 and the circuit board 42, respectively, thereby allowing the active portion 30 to move along the X-axis and Y-axis.

Figure 6:
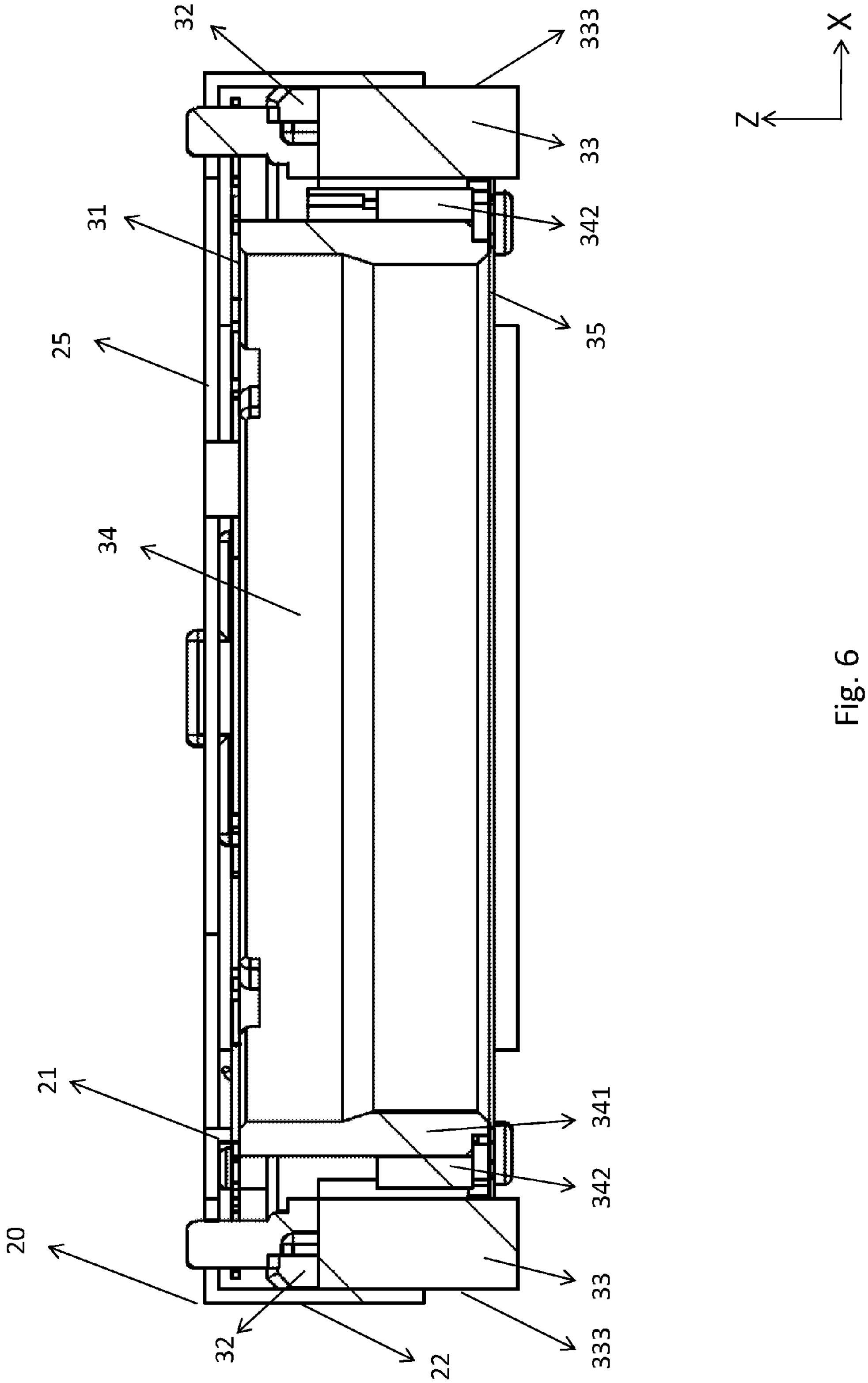
FIG. 6 is a cross-sectional view taken along line C-C of FIG. 5.

Referring to FIG. 6, there is shown a cross-sectional view taken along line C-C of FIG. 5, with reference to an X-axis, a Y-axis and a Z-axis. Components shown in FIG. 6 are identical to their counterparts in FIG. 2 in structure, name and reference numeral and thus are not described hereunder for the sake of brevity. Referring to FIG. 6, the yoke 20 has the top surface 25 which is perpendicular to the Z-axis, and thus the lens holder 34 can move in the direction of the casing 10 only (as shown in FIG. 1). The yoke 20 has an outer wall 22 perpendicular to the top surface 25. The outer wall 22 corresponds in position to the outer surface 333 of the magnet unit 33. The yoke 20 has an inner wall 21 perpendicular to the top surface 25. The inner wall 21 extends to between the Z-axis driving coil 342 and the external wall 341 of the lens holder 34.

Figure 7:
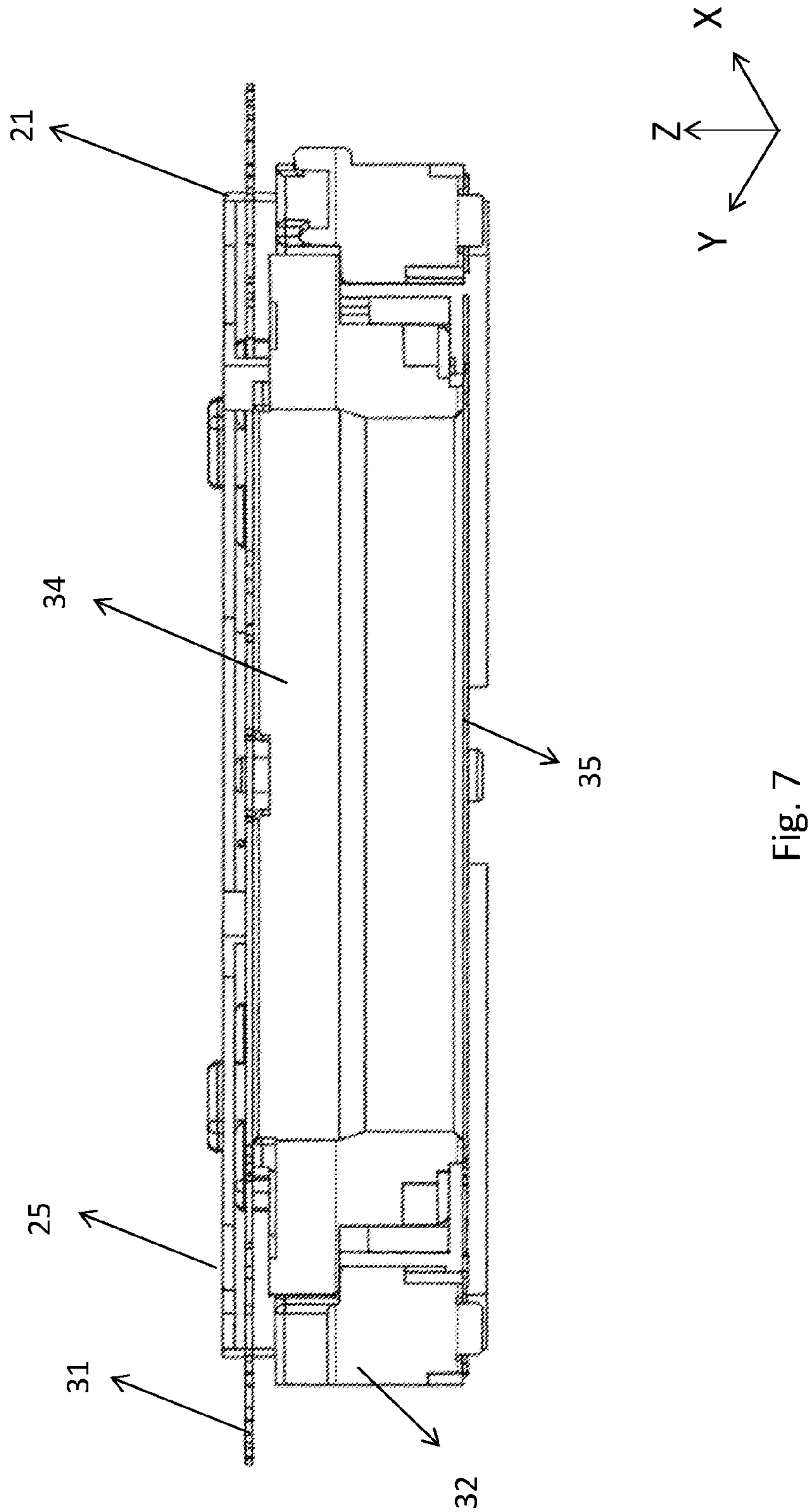
FIG. 7 is a cross-sectional view taken along line E-E of FIG. 5.

Referring to FIG. 7, there is shown a cross-sectional view taken along line E-E of FIG. 5, with reference to an X-axis, a Y-axis and a Z-axis. Components shown in FIG. 7 are identical to their counterparts in FIG. 2 in structure, name and reference numeral and thus are not described hereunder for the sake of brevity. Referring to FIG. 7, since the top surface 25 of the yoke 20 is an octagon, even though the yoke 20 encloses the upper flat spring 31, the recess 311 of the upper flat spring 31 is exposed and penetrated by the suspension lines 44, thereby allowing the lens holder 34 to be suspended along the Z-axis in a predetermined space of the frame 32.

Figure 8:
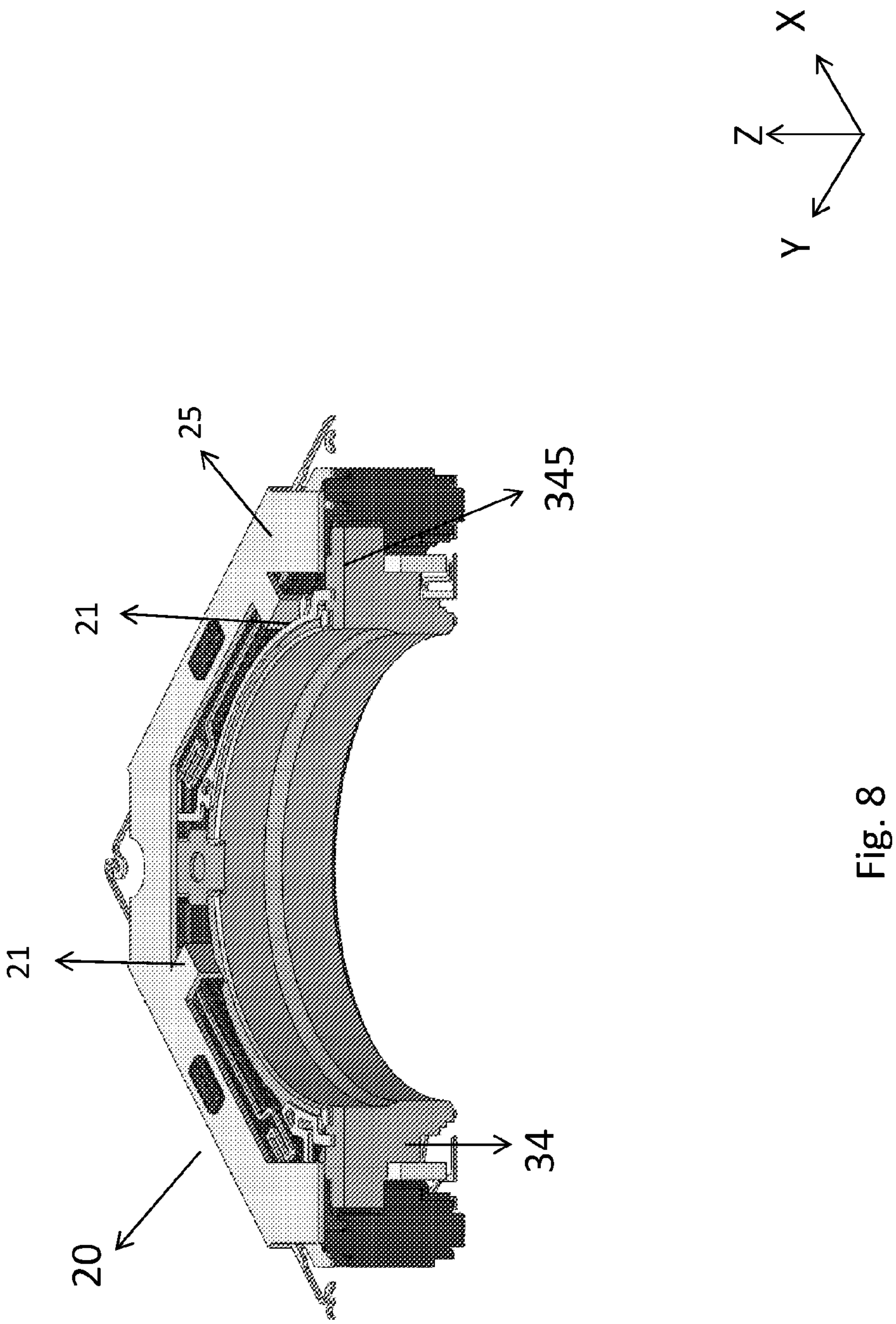
FIG. 8 is a cross-sectional view taken along line E-E of FIG. 5.

Referring to FIG. 8, there is shown a cross-sectional view taken along line E-E of FIG. 5, with reference to an X-axis, a Y-axis and a Z-axis. The lens holder 34 has at least a stop portion 345. The stop portion 345 allows the lens holder 34 to move along the Z-axis toward the yoke 20 for a predetermined distance before being stopped by the yoke 20. The yoke 20 provides the resistance required to stop the lens unit and the lens holder 34 from moving outward along the Z-axis. Therefore, according to the present invention, the yoke 20 and the stop portion 345 of the lens holder 34 together form a stop structure which replaces a stop lid in a conventional picture-taking device and thereby effectively limits the outward movement of the lens unit and the lens holder 34.

Figure 9A:
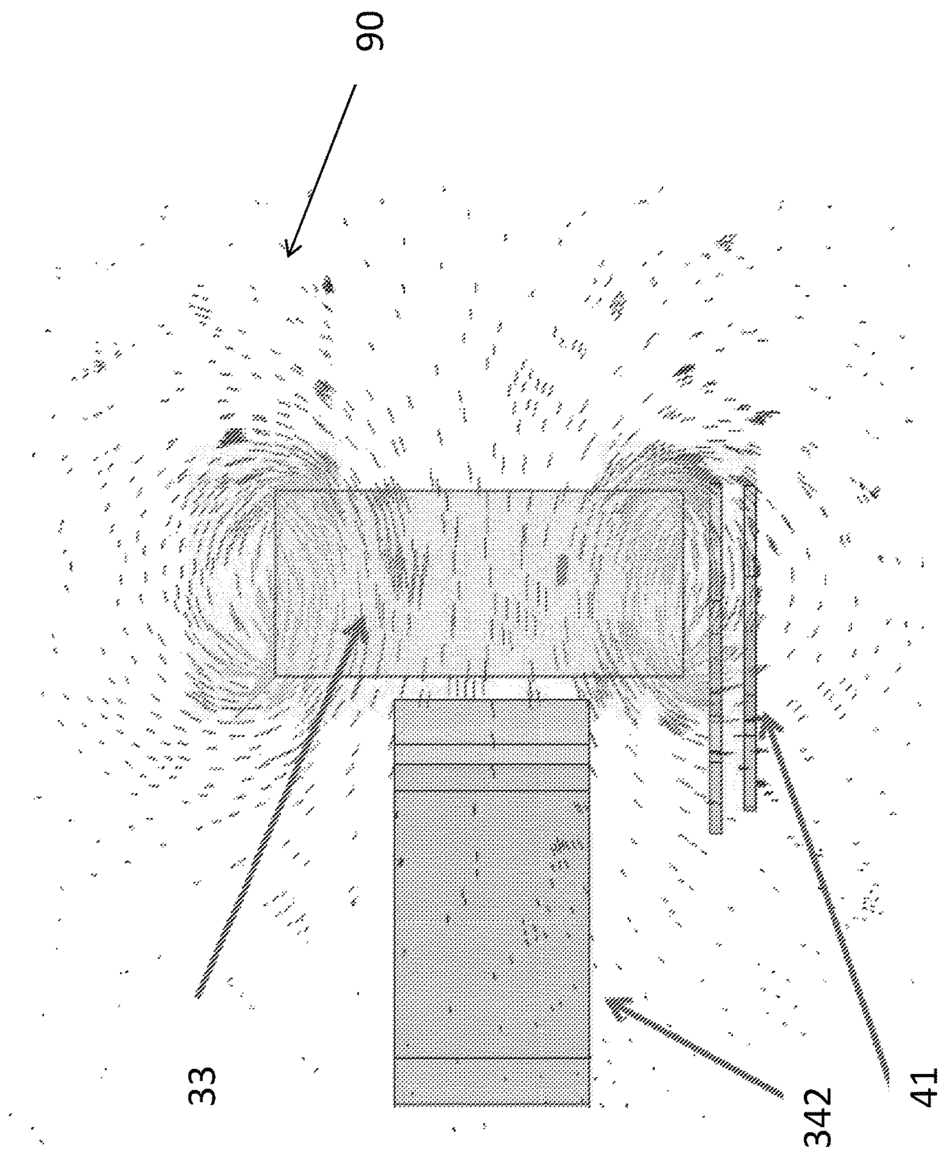
FIG. 9A is a schematic view of the distribution of magnetic lines of force of the optical image anti-shake device without any yoke according to the present invention.

Referring to FIG. 9A, there is shown a schematic view of the distribution of magnetic lines of force of the optical image anti-shake device without any yoke according to the present invention. Regarding the optical image anti-shake device without any yoke, the magnet unit 33 corresponds in position to the Z-axis coil 342 and the coil 41 (comprising the X-axis coil and the Y-axis coil) and generates magnetic lines of force 90 which disperse to the detriment of the correction for the magnet unit 33 between the Z-axis coil 342 and the coil 41. Therefore, optical image anti-shake device without any yoke is not effective in correcting any displacement along the Z-axis and any displacement across the X-Y plane. Furthermore, the magnet unit 33 attracts an external magnetically permeable component readily and thus renders the correcting module inoperable or inefficient.

Figure 9B:
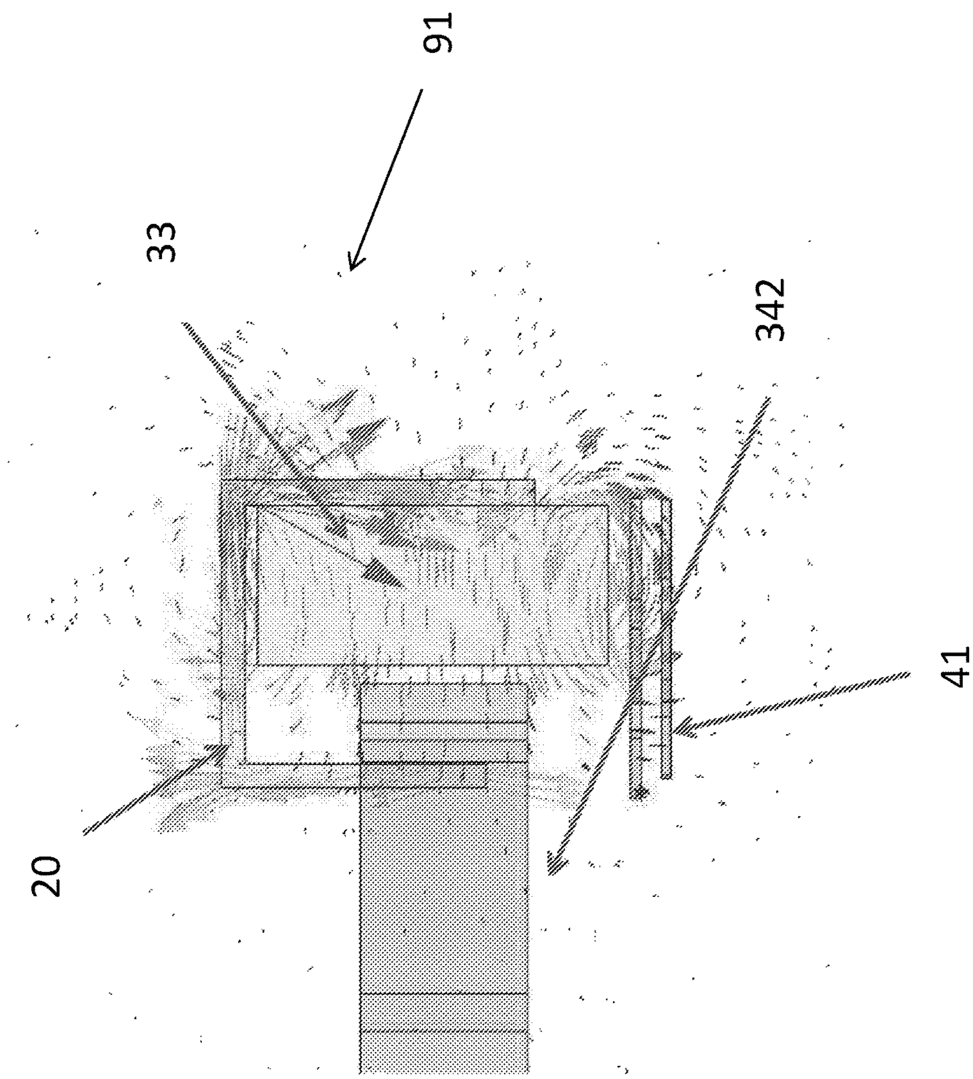
FIG. 9B is a schematic view of the distribution of magnetic lines of force of the optical image anti-shake device with a yoke according to the present invention.

Referring to FIG. 9B, there is shown a schematic view of the distribution of magnetic lines of force of the optical image anti-shake device with a yoke according to the present invention. As shown in FIG. 9B which depicts the optical image anti-shake device with a yoke, the magnet unit 33 corresponds in position to the Z-axis coil 342 and the coil 41 (comprising the X-axis coil and the Y-axis coil). Regarding the optical image anti-shake device with the yoke 20, the convergence of the magnetic lines of force 91 generated from the magnet unit 33 is conducive to the correction for the magnet unit 33 between the Z-axis coil 342 and the coil 41. Therefore, the optical image anti-shake device with the yoke 20 has high magnetic retentivity, enhances a magnetic force, and is effective in correcting any displacement along the Z-axis and any displacement across the X-Y plane, not to mention that the magnet unit 33 is unlikely to attract an external magnetically permeable component, thereby enhancing the efficiency of the correcting module.

Unlike the lens-unit driving device disclosed in Japan Published Patent Application 2011-128583, the optical image anti-shake device with a yoke according to the present invention has advantages as follows: preventing an external magnetically permeable component from interfering with a magnet unit in the optical image anti-shake device; attaining high magnetic retentivity and augmenting a magnetic force in the presence of a magnetically permeable component disposed outside the optical image anti-shake device, not only because magnetic lines of force of the yoke converge, but also because the outer wall, the top surface and the inner wall of the yoke encloses the magnet unit and the Z-axis driving coil partially; and the magnet unit in the optical image anti-shake device is unlikely to attract an external magnetically permeable component, thereby preventing the external magnetically permeable component from affecting the operation of the optical image anti-shake mechanism.

The present invention further provides an image capturing device which comprises the optical image anti-shake device. The image capturing device effectuates optical anti-shake through the optical image anti-shake device.

The image capturing device operates in conjunction with an electronic device, including but not limited to a smartphone, a tablet, and a wearable device. The electronic device is illustrative rather than restrictive of the image capturing device of the present invention. Preferably, the electronic device further comprises control units, display units, storage units, buffer units (RAM), or a combination thereof.

Persons skilled in the art understand that various changes can be made to the embodiments of the present invention without departing from the spirit thereof. Therefore, the embodiments described above are not restrictive of the present invention but aim to cover all amendments made to the present invention as claimed by the appended claims and in accordance with the spirit and scope of the present invention.

What is claimed is:

1. An optical image anti-shake device, comprising:

a casing having a first aperture;

a fixing portion having a bottom plate, the bottom plate having a second aperture corresponding in position to the first aperture; and an active portion enclosed by the casing and resiliently clamped between the casing and the bottom plate by the fixing portion, the active portion comprising:

a correcting module for correcting, with a magnetic force, a blur of images caused by a shake of the optical image anti-shake device;

a frame having a receiving space;

a lens holder disposed in the receiving space of the frame;

a lens unit corresponding in position to the first aperture and the second aperture, the lens unit being carried by the lens holder and having an image-capturing optical axis, wherein an X-axis, a Y-axis and a Z-axis perpendicular to each other are defined; and a yoke, fixed to the frame, having at least a top surface perpendicular to the Z-axis;

wherein when viewing from the Z-axis, the top surface and the correcting module are partially overlapped.

2. The optical image anti-shake device of claim 1, wherein the top surface limits a displacement of the lens holder along the Z-axis.

3. The optical image anti-shake device of claim 1, wherein the yoke has at least an outer wall perpendicular to the top surface and the outer wall corresponds in position to an outer surface of a magnet.

4. The optical image anti-shake device of claim 1, wherein the yoke has at least an inner wall perpendicular to the top surface and the inner wall extends between a Z-axis driving coil and an external wall of the lens holder.

5. The optical image anti-shake device of claim 4, wherein a notch portion is disposed on the external wall of the lens holder to allow the Z-axis driving coil to be disposed on the external wall of the lens holder, and the notch portion accommodates the inner wall of the yoke between the Z-axis driving coil and the external wall of the lens holder.

6. The optical image anti-shake device of claim 4, wherein the active portion further comprises:

an upper flat spring disposed on a lateral surface of the frame;

a lower flat spring disposed on another lateral surface of the frame, wherein the lower flat spring and the upper flat spring clamp the lens holder resiliently within the receiving space of the frame; and at least a Z-axis magnet operating in conjunction with the Z-axis driving coil and correcting a displacement of the lens unit along the Z-axis.

7. The optical image anti-shake device of claim 6, wherein the fixing portion further comprises:

a coil comprising at least an X-axis driving coil and at least a Y-axis driving coil; and a circuit board comprising at least an electronic circuit for controlling the X-axis driving coil and the Y-axis driving coil.

8. The optical image anti-shake device of claim 7, wherein the correcting module comprises:

at least an X-axis magnet disposed between the yoke and the lens holder and corresponding a position to the X-axis driving coil;

at least a Y-axis magnet disposed between the yoke and the lens holder and being beside the X-axis magnet and corresponding in position to the Y-axis driving coil; and a plurality of suspension lines, each of them having two end fixed to the upper flat spring and the circuit board, respectively, to allow the active portion to move along the X-axis and the Y-axis.

9. The optical image anti-shake device of claim 8, wherein the yoke has at least a cut portion so that the plurality of suspension lines are disposed outside the cut portion of the yoke.

10. The optical image anti-shake device of claim 1, wherein the top surface of the yoke is an octagon.

11. The optical image anti-shake device of claim 1, wherein the yoke is made of a magnetically permeable material to not only converge magnetic lines of force in the active portion but also preclude external electromagnetic interference.

12. The optical image anti-shake device of claim 1, wherein the lens holder has at least a stop portion whereby the lens holder moves along the Z-axis toward the yoke for a predetermined distance before being stopped by the yoke.

13. The optical image anti-shake device of claim 1, wherein the yoke and the frame are made by an insert molding process.

14. An image capturing device, comprising features recited in any one of claims 1-13.

15. An electronic device, comprising the image capturing device of claim 14.

16. The optical image anti-shake device of claim 1, wherein the top surface encloses the lens holder.

17. The optical image anti-shake device of claim 8, wherein the X-axis magnet and Y-axis magnet are located between the yoke and the Z-axis driving coil.

* * * * *